United States Patent [19]

Miyazaki et al.

[11] Patent Number: 5,033,164
[45] Date of Patent: Jul. 23, 1991

[54] FISH PROCESSING MACHINE

[75] Inventors: Masatoshi Miyazaki, Yokohama; Ken Sasaki, Higashiyamato; Hachiro Maeda, Tama; Hisami Sakai, Kasukabe; Sumio Kamikawa, Hachioji; Kiyoshi Takai, Tama; Yutaka Ogawa, Ibaraki; Yuichi Tanaka, Toyonaka, all of Japan

[73] Assignees: Nippon Suisan Kaisha Ltd., Tokyo; Nippon Fillestar Co., Ltd., Osaka, both of Japan

[21] Appl. No.: 406,968

[22] Filed: Sep. 13, 1989

[30] Foreign Application Priority Data

Feb. 25, 1989 [JP] Japan ................... 1-44870

[51] Int. Cl.$^5$ .............................. A22C 25/14
[52] U.S. Cl. ................... 452/161; 452/121; 452/135
[58] Field of Search .............. 17/58, 55, 56, 61, 46

[56] References Cited

U.S. PATENT DOCUMENTS

| | | | |
|---|---|---|---|
| 3,707,019 | 12/1972 | Wiggins | 17/58 |
| 3,754,301 | 8/1973 | Grimes | 17/58 |
| 3,925,846 | 12/1975 | Leander | 17/58 |
| 4,195,387 | 4/1980 | Iwase | 17/58 |

FOREIGN PATENT DOCUMENTS 822265 10/1959 United Kingdom ............. 17/58

Primary Examiner—Willis Little
Attorney, Agent, or Firm—Wenderoth, Lind & Ponack

[57] ABSTRACT

In a fish processing machine consisting of fish body feeder, decapitator, belly filleting and viscera removing device, and dark-colored flesh removing device, the fish body feeder is designed to transport the fish body supplied in lying position by feeding onto the tray while aligning the back-belly direction uniformly, and the dark-colored flesh removing device is intended to separate the ordinary flesh and dark-colored flesh of the fish body efficiently to remove the dark-colored flesh.

4 Claims, 14 Drawing Sheets

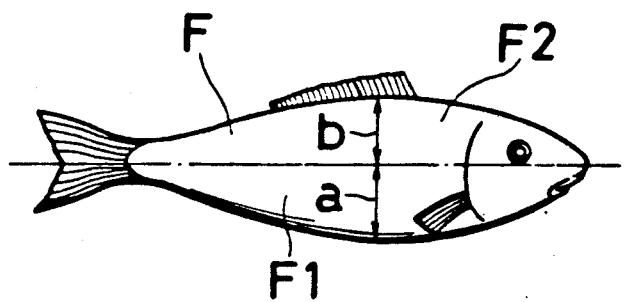
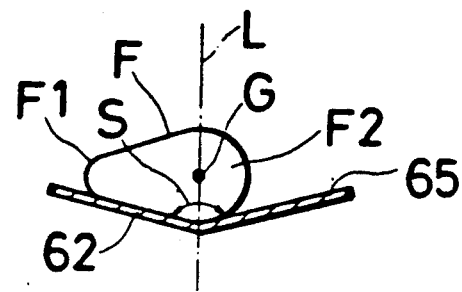
Fig.7 Fig.8
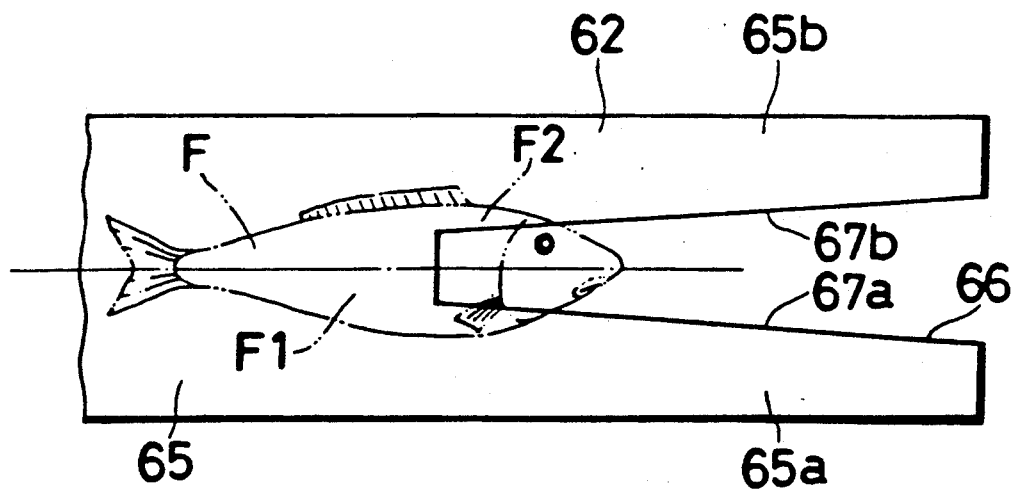
Fig.9

FISH PROCESSING MACHINE

BACKGROUND OF THE INVENTION

1. Field of the Invention

The present invention relates to a fish processing machine. Generally a fish processing machine consists of a fish feeder, decapitator, belly filleting and viscera removing device, and dark-colored flesh removing device. The invention particularly relates to the feeder and dark-colored flesh removing device, and more specifically the feeder relates to a device of conveying by feeding the fish supplied in lying position onto trays disposed at specific intervals one by one with the back-belly direction specified, and the dark-colored flesh removing device relates to a device separating the fish into ordinary flesh and dark-colored flesh and removing the dark-colored flesh.

2. Description of the Prior Art

Of the devices composing the fish processing machine, the decapitator and the belly filleting and viscera removing device are same as the known ones.

To begin with, the prior art of the feeder is described.

In a step of processing a massive quantity of fish for the purpose of row collection or the like, the fish to be processed must be securely put on the trays mounted on a chain or the like at specific intervals one by one, and the fish body must be arranged in a specific back-belly direction for the convenience of subsequent processes such as decapitation, filleting and removal of viscera. In order to perform these two jobs simultaneously, hitherto, the manual labor was employed.

Next is explained the prior art of dark-colored flesh removing device.

In the case of the so-called red flesh fish such as sardine, mackerel and saury pike, as shown in FIG. 16 and FIG. 17, there is an oily layer called sebum at the inner side of the epidermis of the fish body F1, and further inside of the oily layer, there is a so-called dark-colored flesh indicated by reference numeral 102. This dark-colored flesh 102 is easier to row than ordinary flesh 103, and does not taste good. Therefore, when making flesh paste such as fish cake from the fish body F1, mixture of the dark-colored flesh 102 into the ordinary flesh 103 results in reddish change of color of the ordinary flesh 103, which spoils the quality of the fish paste product. Therefore, such dark-colored flesh 102 is conventionally removed. Meanwhile, in the case of white flesh fish such as cod, the dark-colored flesh is not so significant, but must be removed just the same.

In the joining part of the dark-colored flesh 102 and the ordinary flesh 103 which occupies the majority of the fish body L, there is a thin layer made of different texture from other portions, and the dark-colored flesh 102 and the ordinary flesh 103 can be easily separated from each other.

FIG. 18 is a sectional view of a conventional dark-colored flesh removing device 105. In the dark-colored flesh removing device 105, a pair of pressure members 106, 107 formed in a roller shape are disposed, and recesses 108, 109 are formed on the entire outer circumference of the pressure members 106, 107. The pressure members 106, 107 are rotated and driven mutually in reverse directions around the rotary axial line of rotary shafts 113, 114 by means of gears 110, 111, 112. The fish body F1 from which the head and tail are chopped off is guided into a gap 115 formed approximately in an elliptical shape by the recesses 108, 109 by means of guide member (not shown), and is pinched and pressed by the rotation of the pressure members 106, 107. Therefore, as shown in FIG. 19, the ordinary flesh 103 of the fish body F1 is pushed out toward the outside.

In the prior art described herein, since the surface of the fish body F1 is slippery, the fish body F1 may be deviated sideways when pinching the fish body F1 by the pressure members 106, 107, and it cannot be placed exactly in the desired position in the gap 115. When the fish body F1 is pressed in such deviated state, the dark-colored flesh 102 may be mixed into the ordinary flesh 103. Besides, since the size of fish body is not uniform, and the fish body must be selected depending on the size of the gap 115.

Yet, in the prior art, the fish body supplied into the dark-colored flesh removing device is opened only at the belly side, and in order to push out the ordinary flesh efficiently from both belly side to the dorsal side, it is necessary to extremely increase the pushing force of the pressure members 106, 107 into the fish body F1, and in such a case, when the fish body F1 is pressed by the pressure members 106, 107, an excessive force acts on the dark-colored flesh 102 and the backbone 116, and the dark-colored flesh 102 and the backbone 116 may be pushed outward together with the ordinary flesh 103. It is therefore necessary to adjust the pressing force of the pressure members 106, 107 on the fish body F1. However, adjustment of the pressing force of the pressure member 106, 107 requires a complicated structure, and the apparatus is increased in the size.

SUMMARY OF THE INVENTION

The feeder is described in the first place.

According to the prior art mentioned herein, it took too much time and labor for laying and arranging the fish bodies uniformly.

It is hence a primary object of the invention to present a fish body feeder simple in structure, low in manufacturing cost, and few in troubles by solving the above-discussed problems.

The fish body feeder of the invention comprises:
  a conveying trough for conveying fish bodies one by one with the head-tail direction aligned,
  first constant feed means disposed above the conveying trough in a manner free to approach and depart from the conveying trough, and possessing a first rotary feed member which is driven to convey the fish body on the trough from the upstream side to the downstream side,
  a feed trough inclined downward to the downstream side in the fish body conveying direction, possessing a concave fish body conveying surface, and forming a notch near the end portion of the downstream side of the conveying direction,
  a receiving trough disposed beneath the notch,
  back-belly aligning means having a fish body tilting mechanism disposed on a send-out trough disposed at the downstream side of the receiving trough,
  second constant feed means possessing a second rotary feed member for sending out the fish bodies on the send-out trough one by one intermittently, and
  transportation means having plural trays for holding the fish bodies one by one disposed at equal pitches on a moving body driven in the running direction orthogonal to the conveying direction.

In the invention, the first rotary feed member and second rotary feed member may rotate at identical speed.

The operation of this apparatus is explained below. The fish bodies supplies on the conveying trough are constantly supplied one by one by the operation of the first rotary feed member, and are sent into the feed, trough. Here, the fish bodies drop down onto the receiving trough with the back side down from the notch, and the back-belly direction of the fish bodies is aligned by the tilting mechanism, and the fish bodies are moved on the send-out trough. On the send-out trough, by the parallel send-out operation by the second rotary feed member, the fish bodies are discharged one by one onto the trays on the moving body in the specified sequence, and are transported.

The invention, by combining the first constant feed means, back-belly aligning means and second constant feed means with the transportation means, allows to convey the fish bodies automatically as being placed on the conveying means, one by one, with the back-belly direction aligned, and what is more, the apparatus is simple in structure and low in cost, and is free of troubles, and the maintenance labor may be saved, and many other effects are brought about.

The dark-colored flesh removing device of the invention is next described. It is another purpose of the invention to present a dark-colored flesh removing device of fish body capable of securely removing the dark-colored flesh and obtaining flesh enhanced in quality, by solving the above technical problems, securely holding and pressing the fish bodies, regardless of the fish size, without allowing the fish bodies to be deviated sideways or escape, and pressing the fish bodies with a proper pressing force so as not to crush the dark-colored flesh 102 and the backbone 116 without complicating the structure.

The dark-colored flesh removing device of the invention for filleting the belly in the longitudinal direction, conveying the fish body in decapitated state, and removing the dark-colored flesh of the fish body comprises:
- a pair of endless conveying chains being disposed above and below in the vertical direction for conveying the fish bodies along the longitudinal direction,
- holding members disposed parallel to the chains, of which
lower side holding member is disposed in the lower side conveying chain along the conveying route and possesses a concave fish body holding surface and;
- upper side holding member is disposed in the upper side conveying chain along the conveying route and is made of elastic and flexible material, being mounted on a support member,
- a pressing member for thrusting and pressing the confronting holding surfaces of the upper side and lower side holding members in the mutually approaching directions, and
- means for filleting the dorsal side of the fish body being disposed at the upstream side of the conveying route from the pressing member.

In the invention, a hollow part is provided between the upper side holding member and support member disposed on the upper side conveying chain.

Also in the invention, the space between the upper side holding member and support member disposed on the upper side conveying chain is filled up with a flexible material.

According to the invention, when the fish body filleted in the belly in the longitudinal direction and decapitated is supplied at the start end of the conveying chain, it is held between the holding surface of the upper side and lower side holding members. The fish body is, at this time, held between the elastic and flexible holding member at the upper side and the concave holding member disposed on the conveying chain at the lower side, so that the fish body may be held securely without sliding sideways regardless of the size of the fish body. The fish body thus held between the holding surfaces is conveyed along the conveying route by the traveling and driving of the conveying chain. In the midst of conveying, the back of the fish body is filleted by the cutting means, and the confronting holding surfaces of the holding members are pressed in the mutually approaching directions by the pressing members. At this time, since the holding members are made of elastic and flexible material, the fish body can be pressed to such an extent that the backbone or flesh may not be crushed, and the holding surfaces are deformed in such a manner as to avoid the backbone and dark-colored flesh, so that the dark-colored flesh remains between the holding surfaces in a state contacting tightly with the backbone. In this manner, without requiring complicated structure and without increasing the size of the apparatus, the dark-colored flesh can be securely removed, and the fish can be separated into ordinary flesh and dark-colored flesh regardless of the fish body.

Thus, according to the invention, since the holding surface of the holding member disposed on the lower side conveying chain is formed in a concave shape, the held fish body is partly entrapped in the concave holding surface on the lower side by the elastic and flexible holding member disposed on the upper side conveying chain and the lower side holding member, and the dislocation of the fish body in the lateral direction of its conveying route is defined, so that the fish body can be securely held and conveyed. Therefore, regardless of the size of the fish body, lateral dislocation of the fish body may be prevented, and the dark-colored flesh may be removed at an advanced yield. Besides, because of the back cutting means, the ordinary flesh can be pushed to the outside sufficiently with a small pressing force. Furthermore, since a chain is used as the means for conveying the fish body, the fish body may be conveyed smoothly while removing the dark-colored flesh without causing jerky motion. As a result, the flesh of improved quality will be obtained.

Moreover, according to the invention, since at least one of the holding members is made of an elastic and flexible material, when pressed by the pressing member in a held state, it is elastically deformed depending on the fish size so as to avoid relatively hard portions such as the backbone of the fish body, and the portion of the dark-colored flesh and skin sticking to the backbone and the ordinary flesh can be separated without crushing the backbone, and the ordinary flesh can be easily pushed out. Hence, without complicating the structure and increasing the size of the apparatus, the dark-colored flesh can be securely removed regardless of the size of the fish body, and an ordinary flesh free from dark-colored flesh can be obtained.

BRIEF DESCRIPTION OF THE DRAWINGS

FIG. 7 is a simplified plan view of the fish body, FIG. 8 is an explanatory front view of basic action of conversion of the position of the fish body, FIG. 9 is an explanatory plan view of basic action of conversion of the position of the fish body.

DETAILED DESCRIPTION OF THE PREFERRED EMBODIMENTS

Figure 1:
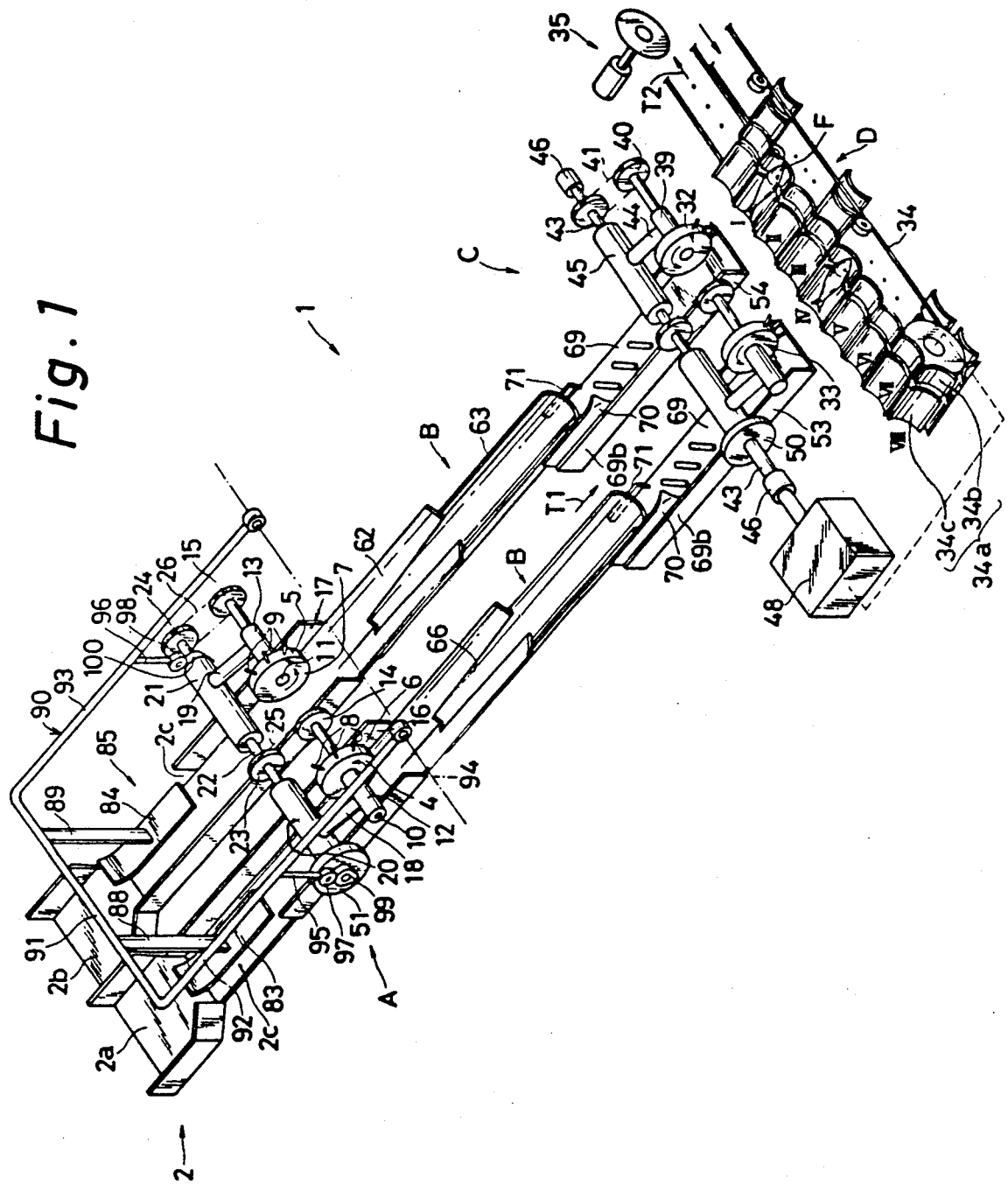
FIG. 1 is a simplified perspective view of an embodiment of the invention.

Referring now to the drawings, some of the embodiments of the fish body feeder of the invention are described in detail below.

As shown in FIG. 1, the invention is composed by roughly combining first constant feed means A for feeding fish bodies at specific intervals one by one, back-belly aligning means B for angularly dislocating the fish body F around the body and aligning the back-belly direction uniformly, second constant feed means C for mounting the fish body F intermittently on a tray 34a, and transportation means D for receiving and transporting the fish body F in cooperation with the second constant feed means C.

The first constant feed means A descends and inclines to the downstream side so as to feed the fish body F in the longitudinal direction one by one, and possesses, for example, two rows of conveying troughs 16, 17 placed parallel, and first rotary feed members 4, 5 disposed above the conveying troughs 16, 17 in a manner free to approach and depart from the troughs 16, 17, respectively. The first rotary feed members 4, 5 include rotors 6, 7 which are rotates and driven in the rotating direction for conveying the fish body F on the conveying troughs 16, 17 from the upstream side to the downstream side in the conveying direction T1 around the axial line of rotary shafts 10, 11 extending in the horizontal direction at right angle to the conveying direction of the conveying troughs 16, 17. On the peripheral surfaces of these rotors 6, 7, stopping pieces 8, 9 in partially in shape are projecting. The rotary shafts 10, 11 are fixed with rotors 6, 7, and are supported by bearings 12, 13, and sprocket wheels 14, 15 are fixed thereto.

Figure 4:
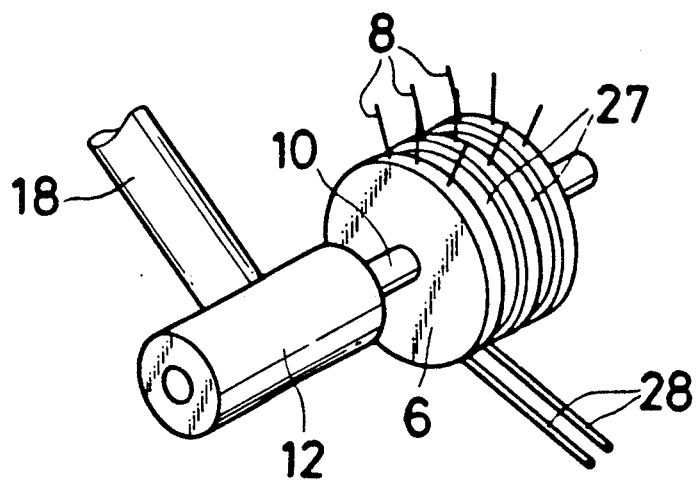
FIG. 4 is an enlarged perspective view near a rotor.

The bearings 12, 13 are fixed on bearings 20, 21 through arms 18, 19. The bearings 20, 21 support a horizontal rotary shaft 22 supported at fixing position. On the rotary shaft 22, sprocket wheels 23, 24 are fixed, and the sprocket wheels 14, 15 are driven through chains 25, 26. In the rotor 6, as shown in FIG. 4, two rows of grooves 27 are formed along the peripheral direction, and holding pins 28 provided at fixing position and having elasticity are fitted therein.

Figure 2:
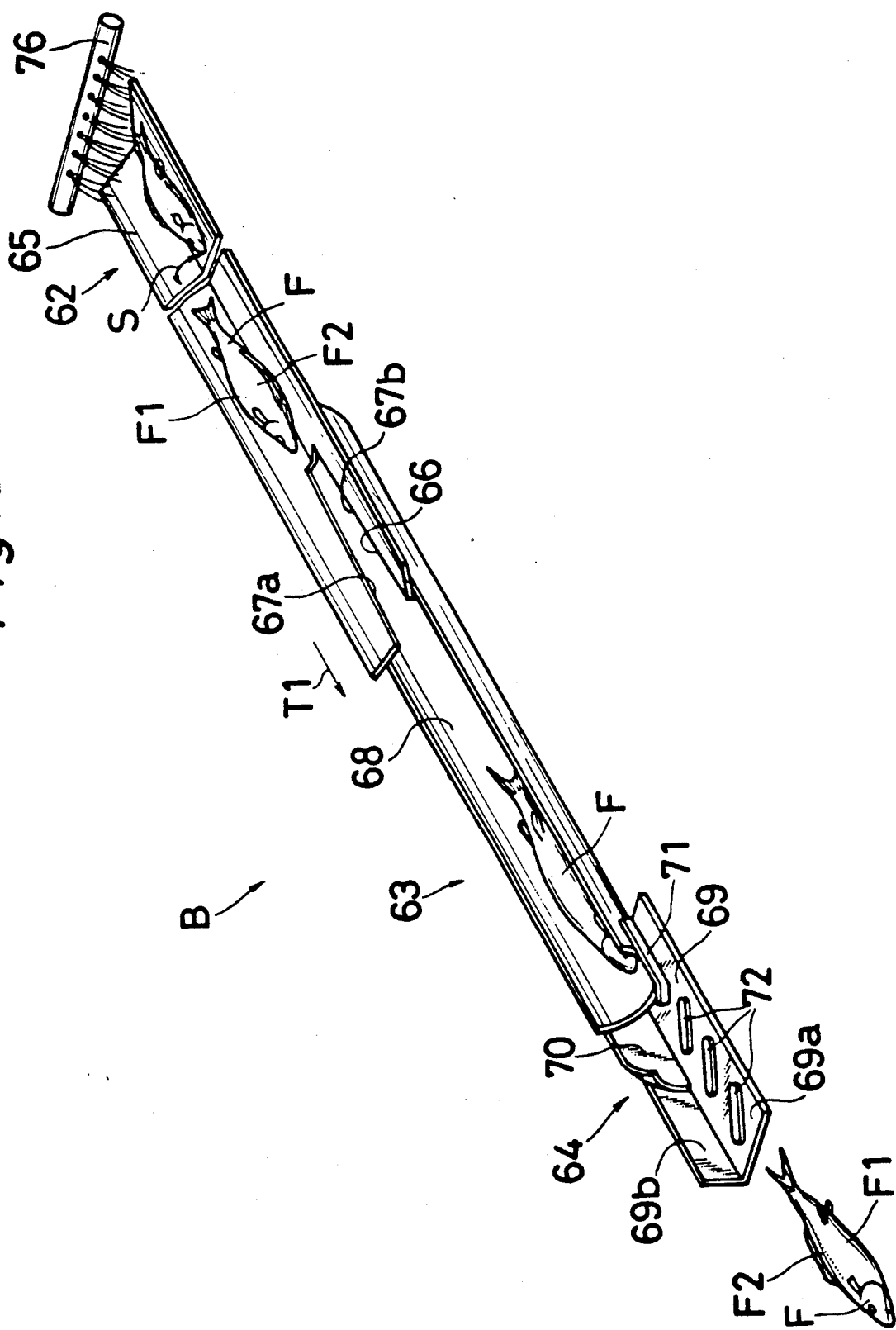
FIG. 2 is a perspective view of back-belly aligning means.

Next, the back-belly aligning means B is, as shown in FIG. 1 and FIG. 2, disposed at the downstream side of the first constant feed means A, and descends and inclines to the downstream side so that the fish body F may slide down, and also includes a feed trough 62 disposed parallel to the conveying troughs 16, 17, a receiving trough 63 which is disposed beneath the downstream side end portion of the feed trough 62 and is formed integrally with the feed trough 62, and a fish body tilting mechanism 64 disposed near the opening of the downstream side of the receiving trough 63.

The feed trough 62 comprises a fish body conveying surface 65 on which the fish body F dropped on the feed trough 62 is conveyed, and this fish body conveying surface 65 is formed approximately in a concave V-shape and possesses a predetermined angle S. At the downstream side end of the fish body conveying surface 65, a notch 66 is formed. This notch 66 opens to the downstream side, and is gradually opened toward the downstream side. The peripheral edge of this notch 66 is defined by guide surfaces 67a, 67b continuous with the conveying surface 65, and these both guide surfaces 67a, 67b are formed symmetrically to the axial line of the fish body conveying surface 65. At the upstream side of the feed trough 62, a nozzle 76 is disposed for injecting a specific rate of water into the feed trough 62 in order to allow the fish body F to slide down easily.

The receiving trough 63 forms, as described later, an approximately U-shaped receiving surface 68 for receiving the fish body F with the dorsal part F2 of the fish body F downward, and feeding into the fish body tilting mechanism 64. The fish body tilting mechanism 64 comprises a guide plate 69 in an almost L-shape disposed at the end portion of the downstream side of the receiving trough 63, a fish body pressing plate 70 having one end fitted to the downstream side end portion of the receiving trough 63 and the other end curved inward, a hooking member 71 fitted to the downstream side end portion of the receiving trough 63 and in the lower part opposite to the fish body pressing plate 70, and plural guide protrusions 72 disposed on the bottom 69a of the guide plate 69 at the downstream side of the fish body pressing plate 70 and hooking member 71. The guide protrusions 72 are parallel to each other, and are inclined in the direction approaching the side portion 69b of the guide plate 69 as going toward the downstream side. The back-belly aligning means B is disposed, for example, in a pair continuously to the constant feed device A.

Figure 6:
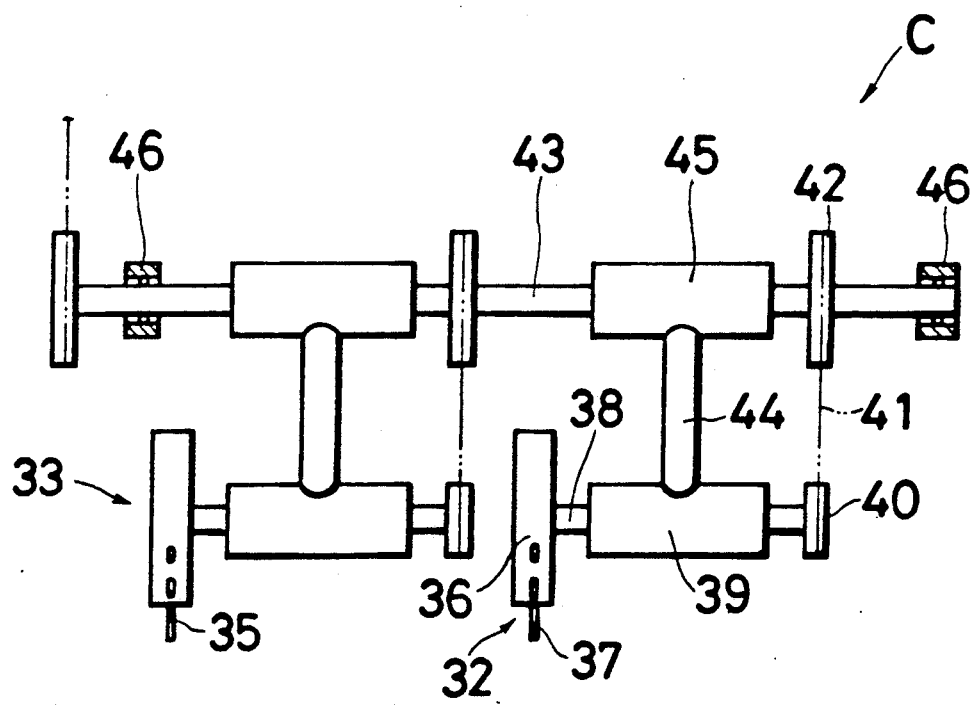
FIG. 6 is a plan view near the send-out member.

FIG. 6 is a plan view of the second constant feed means C. The second constant feed means C possesses two rows of send-out troughs 53, 54 connected to the downstream side of the back-belly aligning means B, and on these troughs 53, 54 are disposed parallel two second constant feed members 32, 33 connected to the troughs 53, 54, respectively, with their center lines shifted to the side portion 69b side of the guide plate 69 (to the left in FIG. 1) from the center lines of the send-out troughs 53, 54, being adjusted to the fish body F sent out from the guide plate 60. The second constant feed member 32 is, as obvious from FIG. 6, has the stopping piece 37 partially in a pin shape projected on the peripheral surface of the rotor 36 fixed to the rotary shaft 38.

The rotary shaft 38 is supported by the bearing 39, and is rotated and driven through sprocket wheel 42, chain 41 and sprocket 40, by the rotary shaft 43 linked to the gear box 48 so as to deliver the rotating force from the drive source in two different rotating directions. The bearing 39 is fixed by the bearing 45 and arm 44 which support the rotary shaft 43, and is allowed to oscillate about the rotary shaft 43. The other second rotary feed member 33 is similarly composed, and the two second rotary feed members 33, 36 are in phase on the circumference at the positions of stopping pieces 37, 35, and are rotated and drived at identical speed. Besides, the both second rotary feed members 32, 33 are provided with same holding pins (not shown) as the holding piece 28 of the first rotary feed members 4, 5.

The rotary shaft 43 is supported by the bearing 46 disposed at the fixing position. The second rotary feed members 32, 33 and the first rotary feed members 4, 5 are rotated at identical speed by the sprockets 50, 51 fixed on the rotary shafts 43, 22, and endless chain 52 (FIG. 3) applied on these sprockets.

The transportation means D contains an endless chain 34 on which multiple trays 34a for mounting the fish bodies F one by one are installed at equal pitches, and it is driven in cooperation with the rotary shaft 43 by means of gear box 48.

The chain 34 is disposed at the downstream side of the second constant feed means C as being driven in the scanning direction T2 to the horizontal direction orthogonal with the conveying direction T1 of the fish body F, and is designed to run in the horizontal direction at right angle to the send-out troughs 53, 54 arranged parallel. As shown in FIG. 1, the center interval of the send-out troughs 53, 54 and the total length of three pitches of the trays 34a of the chain 34 are determined to be equal to each other. The traveling speed of the chain 34 is set so as to move by two pitches each per revolution of the second rotary feed members 32, 33.

Figure 3:
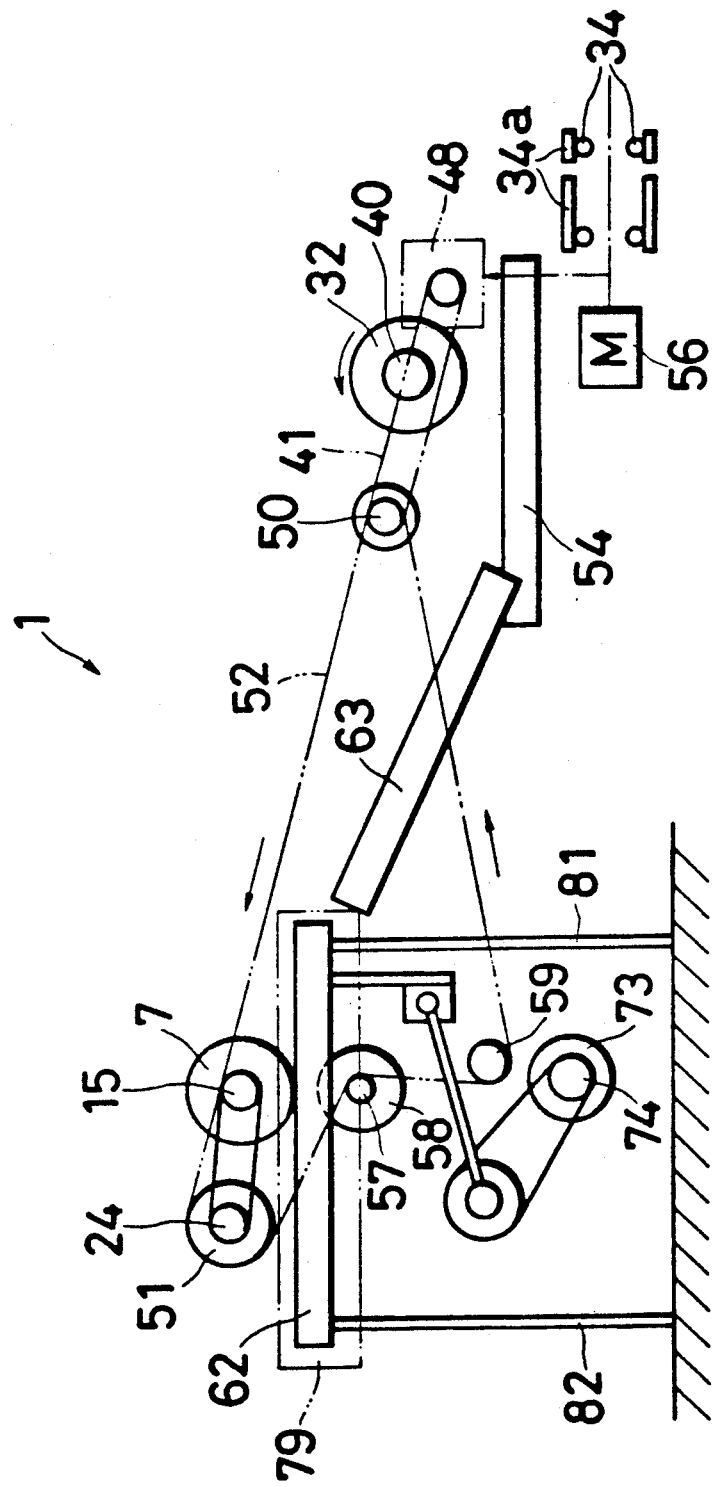
FIG. 3 is a front view of a fish body feeder 1.

As shown in FIG. 3, furthermore, the rotary force of the motor 56 is transmitted to the chain 34 to drive the fish body feeder 1. On the other hand, this rotary driving force is transmitted to the gear box 48, and the rotating direction is converted to 90 degrees to rotate the sprocket wheel 50. As a result, the second feed members 32, 33 are driven as mentioned above. On the other hand, the driving force of the sprocket wheel 50 drives the sprocket wheels 51, 57 and idle wheel 59 by the chain 52 as shown in the drawing.

On the sprocket wheel 57, for example, a rotor 58 in the same composition as the rotor 7 is coaxially disposed, and it holds the fish body F together with the rotor 7 to convey it securely.

Figure 5:
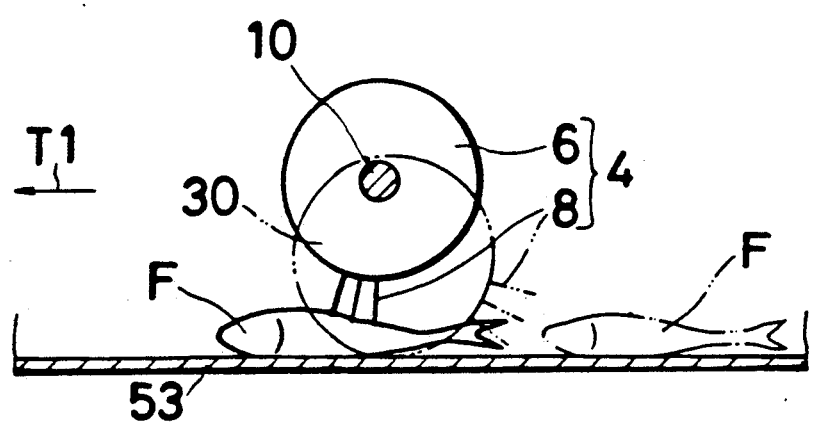
FIG. 5 is an explanatory diagram of fish body conveying operation by a rotary feed member.

In this apparatus, 1, the operation is as follows. The fish body F is sent into the guide means 2 with the head ahead, and is transferred into the conveying troughs 16, 17 through troughs 2a and 2b of the guide means 2, but when two or more fish are sent out simultaneously from the trough 2a, the others except for one drop off from the notch 2c. The fish bodies F sent onto the conveying troughs 16, 17 one by one linearly slide down along the slope to reach the first constant feed means A, and each fish is skewered on the stopping pieces 8, 9 along with the rotation of the first rotary feed members 4, 5 as shown in FIG. 5, and is conveyed downstream.

After one session of conveyance, the stopping pieces 8, 9 are departed from the fish body F by the operation of the holding pin 28, and the fish body F is conveyed on the conveying troughs 16, 17. The rotary feed member 4 is, as indicated by reference numeral 30 in FIG. 4, is at the lowered position while not conveying, and is ready to oscillate by the arm 18. It is the same for the other first rotary feed member 5.

Figure 10:
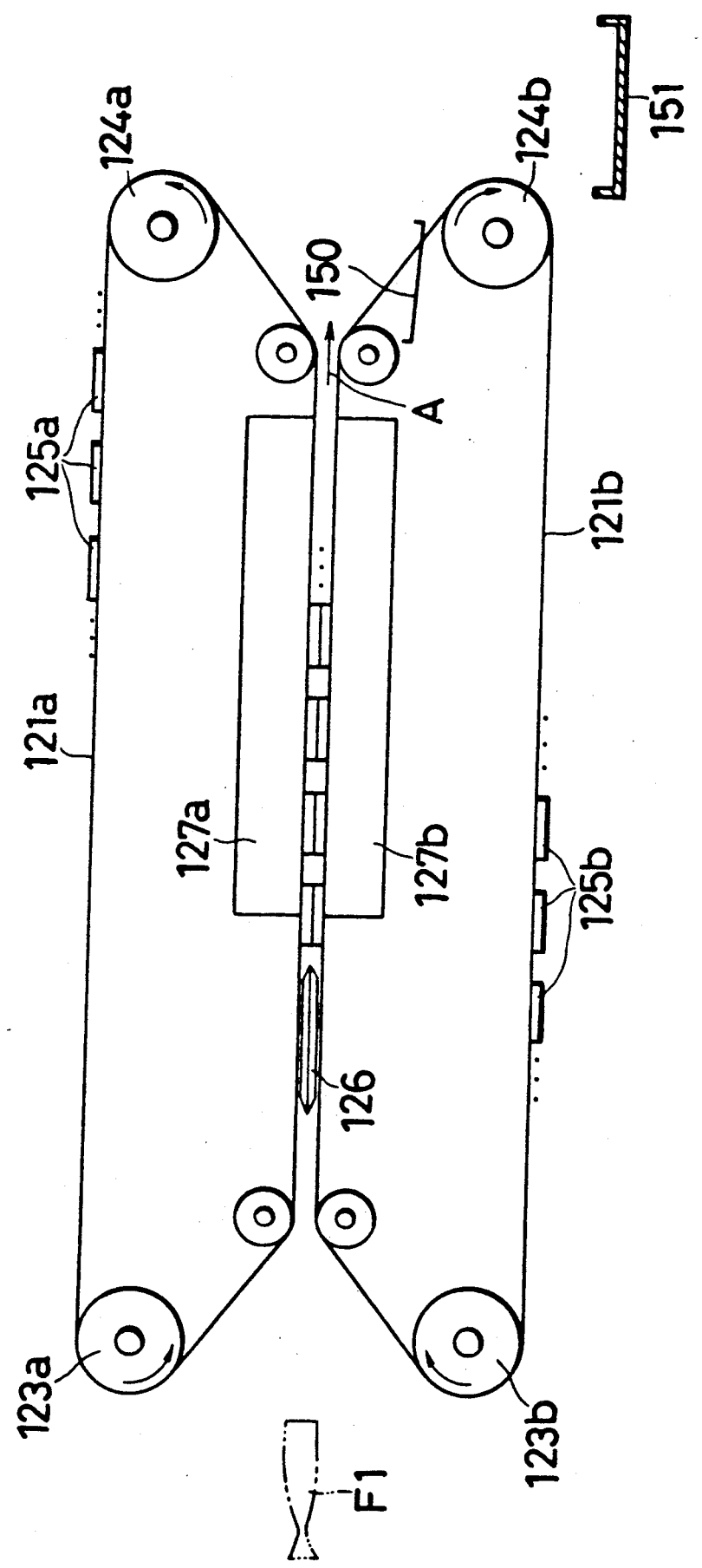
FIG. 10 is a side view of a dark-colored flesh removing device 120 in an embodiment of the invention.

Consequently, at the back-belly aligning means B, as shown in the simplified plan view of the fish body F (FIG. 7), the fish body F is greater in the width a of the belly portion F1 than in the width b of the dorsal portion F2. The fish body F flowing on the spray of water form the upstream side nozzle 76 of the feed trough 62 is, as shown in FIG. 8, conveyed to the downstream side on the fish body conveying surface 65 while sliding sideways in the direction of approaching the center line L of the feed trough 62 forming a V-shape in the center of gravity G (at the dorsal F2 side of the fish body) by its own weight. While the fish body F is opposing the notch 66, as shown in FIG. 10, the dorsal part F2 is opposite on the notch 66, and the majority of the belly F1 is supported on one conveying surface 65a of the feed trough 62.

In such state, when the fish body F advances on the notch 66, the dorsal part F2 gets into the notch 66, and when further moving forward to pass through the notch 66, it is rotated about the body to be converted into the position so that the belly F1 be upward and the back F2 be downward, and it passes through the notch 66 in this state to fall into the receiving trough 63 near the opening.

The fish body F supplied onto the receiving surface 68 of the receiving trough 63 is conveyed into the tilting mechanism 64. The fish body F supplied on the tilting mechanism 64 is in a position with the back F2 side down, and the fish body pressing plate 70 abuts against one side of the fish body F, and presses the upper portion (belly F1) of the fish body F with its inward curved part, while the hooking member 71 abuts against the other side lower portion so that the fish body F is set free at the lower end, and the position is converted so that the belly F1 is opposite to the running direction T2 (the right side in FIG. 1) and that the back F2 be opposite to the lateral part 69b side of the guide plate 69. Furthermore, when the fish body F is put on the bottom 69a of the guide plate 69 and conveyed, the fish body F receives the action of the guide protrusion 72 to be shifted to the lateral portion 69b side, so as to be conveyed in the state of allowing the back F2 to slide on the lateral portion 69b. The fish body F thus passing through the tilting mechanism 64 is aligned in the back-belly direction, having the belly F1 at the downstream side of the running direction T2, and the back F2 at the upstream side.

The fish body F is charged into the feed trough 62 from the head side in the foregoing explanation, but when charged from the tail side, the position is always converted when falling from the notch 66 by the principle mentioned above so that the dorsal part F2 may be down and the belly F1 up, and when passing through the tilting mechanism 64, the back-belly direction is correctly aligned same as in the above embodiment.

In the case of a nearly symmetrical fish (such as sardine and cod) that is nearly equal in the width a of the belly F1 and width b of the back F2, the water injection from the nozzle 76 may be increased so that the fish body may slide easily sideways in the midst of conveyance through the conveying surface 65, or the tilting angle of the feed trough 62 is increased, or the V-angle S of the feed trough 62 may be narrowed, so that the same effects as stated above will be obtained.

In the second constant feed means C, the two rows of rotary feed members 32, 33 are located above the center of the fish body F being supplied in the send-out troughs 53, 54, and operate same as the rotary feed members 4, 5 to skewer each fish body F1 on its stopping piece 37 at every rotation of the send-out members and to send out to the downstream of the transportation means D at the same time.

The transportation means D transports by receiving the fish bodies F1 one by one from the send-out means C on the tray 34a on the chain 34 (including the first tray portion 34b and second tray portion 34c), and the head is chopped off by the tray portions 34b, 34c by the cutting means 35 provided on the way.

Referring next to FIG. 10 to FIG. 19, an embodiment of dark-colored flesh removing device of the invention is explained below.

FIG. 10 is a side view of the dark-colored flesh removing device 120 in one of the embodiments of the invention. A pair of endless conveying chains 121a, 121b are applied and stretched between the sprocket wheels 123a, 123b at the start end side, and sprocket wheels 124a, 124b at the finish end side. These sprocket wheels 123a, 123b, 124a, 124b possess mutually parallel horizontal rotary axial lines. The sprocket wheels 123a, 123b are rotated and driven by a drive motor (not shown) about the rotary axial line, so that the conveying chains 121a, 121b are driven nearly at identical speeds.

On the conveying chains 121a, 121b, plural holding members 125a, 125b for holding the fish body F1 are disposed parallel, closely to each other. When the fish body F1 is supplied from the start end side, it is held by the holding members 125a, 125b, and is conveyed in the conveying direction A by means of conveying chains 121a, 121b.

The dark-colored flesh removing device 120 comprises a rotary circular knife 126 for filleting the dorsal part of the fish body F along the conveying route, and pressing members 127a, 127b for thrusting the holding members 125a, 125b opposite along the conveying route of the fish body F1 in the mutually approaching direction. The rotary circular knife 126 possesses a rotary axial line vertical to the conveying route, and the dorsal skin of the fish body F1 is cut open.

Figure 11:
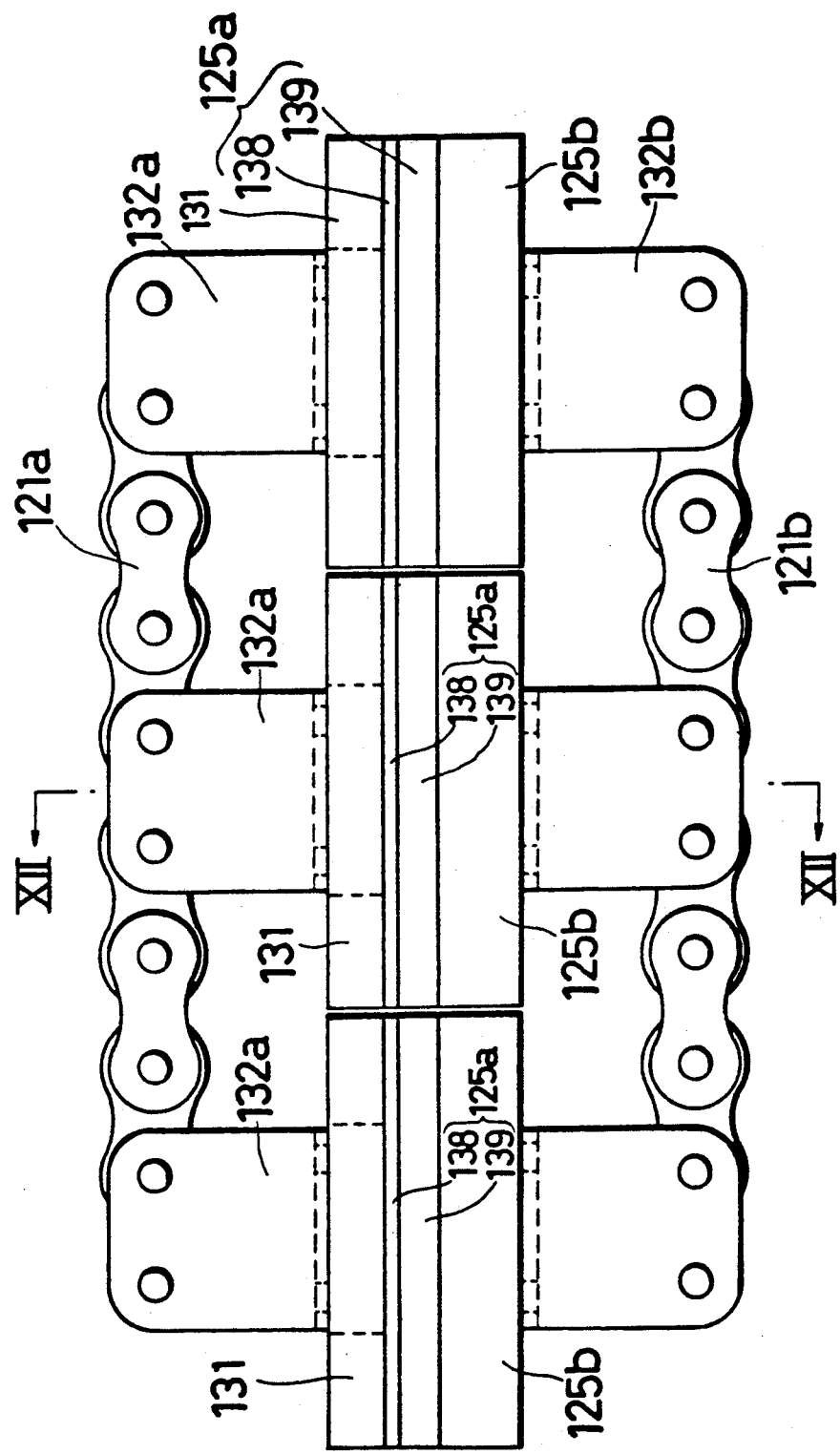
FIG. 11 is a side view of holding members 125a, 125b.

FIG. 11 is a side elevation of the holding members 125a, is a sectional view seen from line III—III in FIG. 11. The holding member 125a is fitted to the conveying chain 121a through support member 131 and mounting member 132a. A bolt hole 134a for inserting a bolt 133a is opened in the support member 131. In the mounting member 132a, a bolt hole 135a is formed so that the bolt 133a may be inserted while the support member 131 is disposed at the mounting position. The bolt 133a is inserted into these bolt holes 134a, 135a, and a nut 136a is engaged therewith. In shc state having the support member 131 fitted to the mounting member, 132a, the head 137a of the bolt 133a is buried in the support member 131. The support member 131 and mounting member 132a are, for example, made of metal. The holding member 125a is attached to the support member 131. The holding member 125a possesses a spacer 138 affixed to the support member 131 and a pressure-fit member 139 affixed to the spacer 138. The spacer 138 is made of rubber or soft synthetic resin material, and possesses an elasticity. To such spacer 138 is affixed the pressure-fit member 139. The pressure-fit member 139 is made of a softer material than the spacer 138, and possesses both elasticity and flexibility. When such pressure-fit member 139 is fitted to the support member 131 through the spacer 138, a space 140 is formed. Meanwhile, the lower surface of the pressure-fit member 139 forms a holding surface 130a.

The holding member 125b is, for example, made of metal, and is fitted to the conveying chain 121b through the mounting member 132b. A bolt hole 134b for inserting a bolt 133b is formed in the holding member 125b. In the mounting member 132b, a bolt hole 135b for inserting the bolt 133b is formed. The bolt 133b is inserted into bolt holes 134b, 135b, and is fastened with a nut 136b, so that the holding member 125b is fixed to the mounting member 132b. The head 137b of such bolt 133b is buried in the holding member 125b, thereby forming a groove 141 extending in the vertical direction in FIG. 12, opening against the holding surface 130b. A burying piece 142 is rigidly fitted into the groove 141. As a result, the holding surface 130b is formed in a concave shape on the whole. This burying piece 142 is made of a same soft material as the pressure-fit member 139, and it works to prevent lateral slip of the fish body. Moreover, placing such burying piece 142 into the groove 141, remaining of the flesh pushed out by this apparatus 120 in the groove 141 is prevented, and growth of bacteria formed in such residue is effectively prevented, so that the apparatus can be kept in a clean state. Also cleaning is easy, and servicing labor may be saved.

Figure 12:
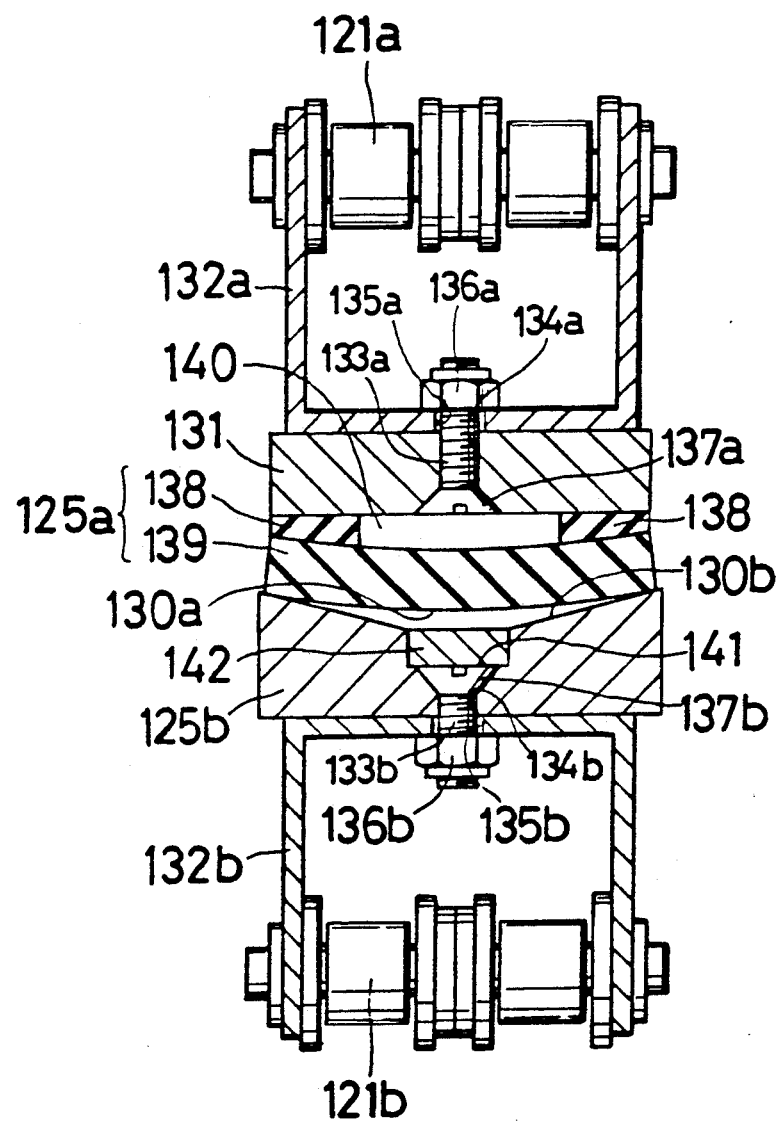
FIG. 12 is a sectional view of line III—III in FIG. 11, FIG. 13, FIG. 14 and FIG. 15 are drawings to show the operation of the dark-colored flesh removing device.

Meanwhile, when fitting members 125a, 125b on the conveying chains 121a, 121b, it may be possible to install in other structure instead of the structure shown in FIG. 12.

Figure 13:
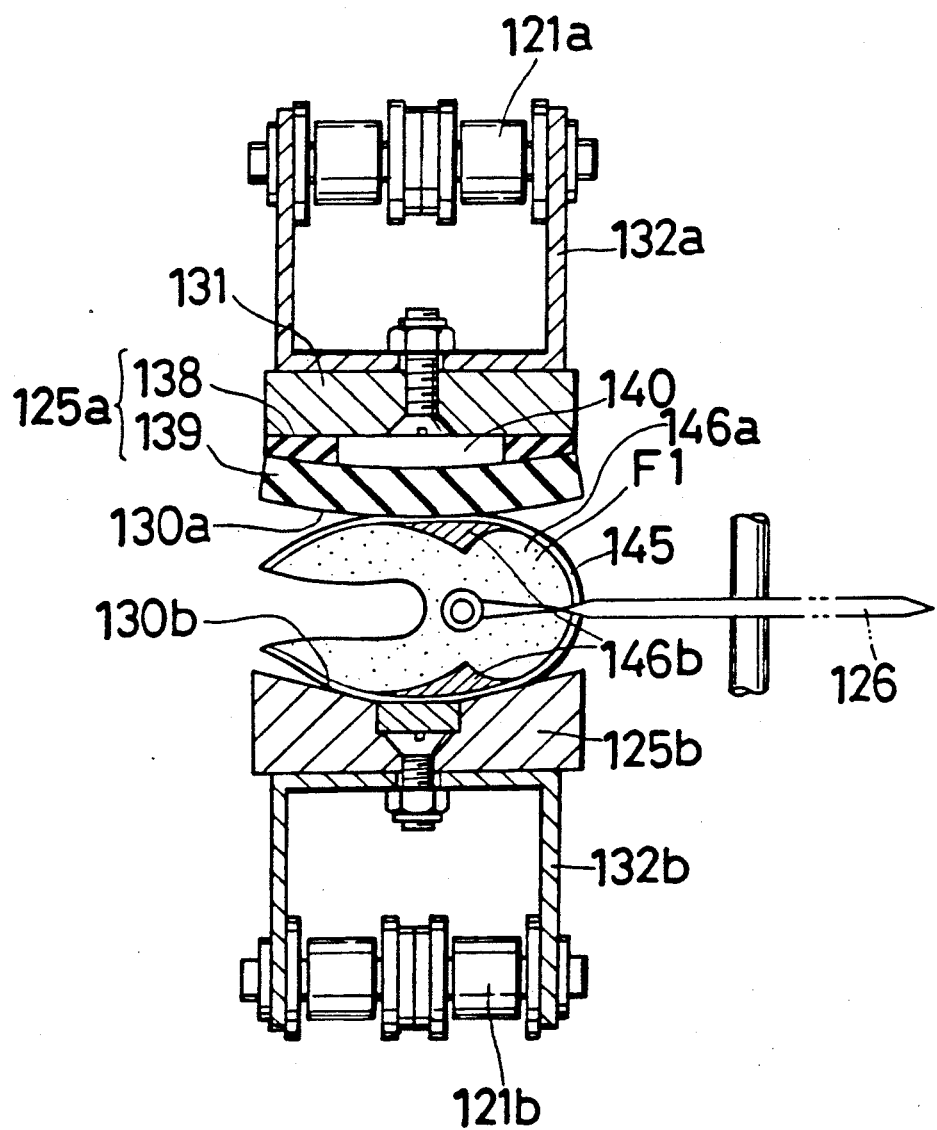
Figure 14:
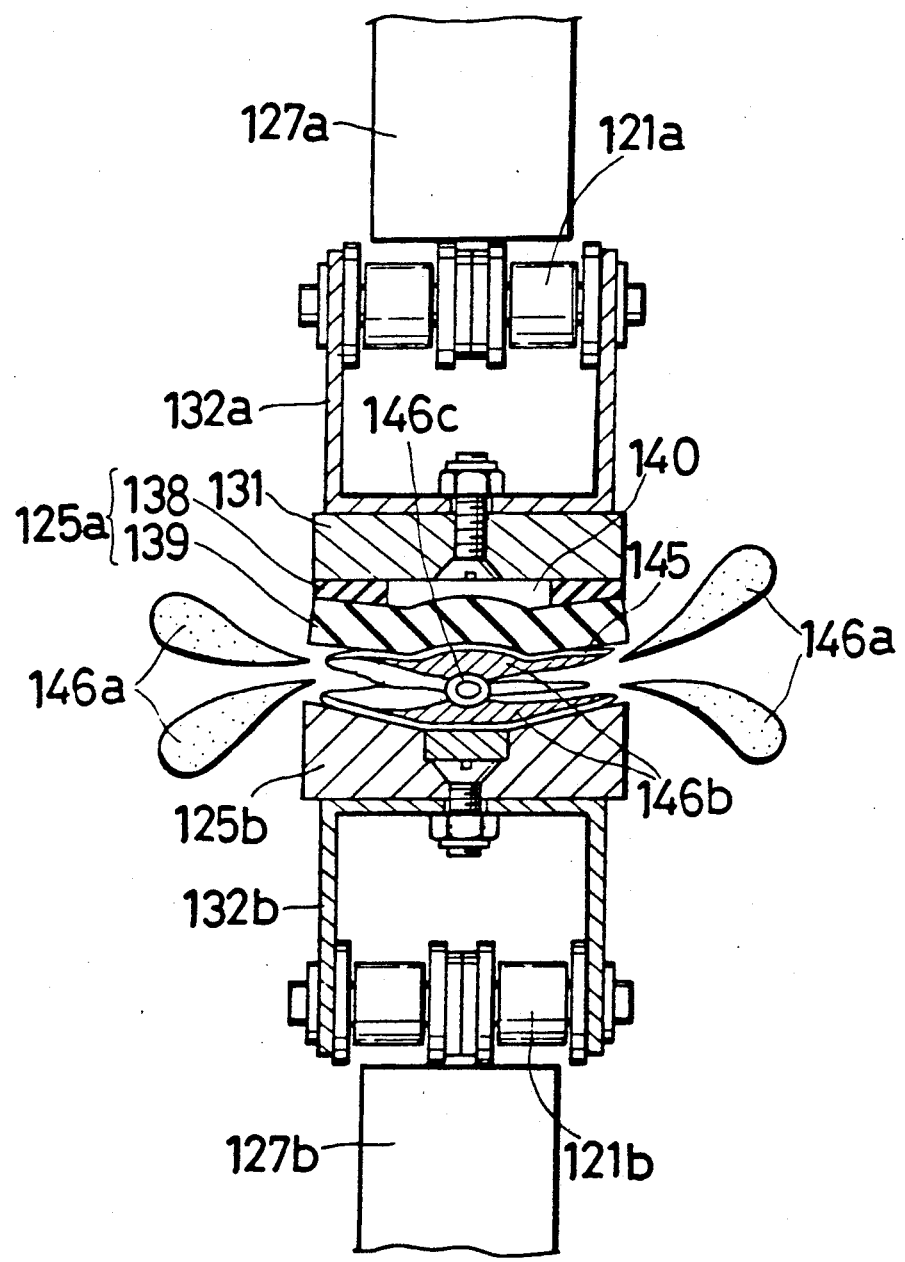

The dark-colored flesh removing action of thus composed dark-colored flesh removing device 120 is explained below. The fish body F1 is preliminarily decapitated, cut in the belly and rid of the viscera, and these processings are done by other processing devices. The fish body F1 is delivered into the device 120 in a predetermined directivity so that the dorsalpectoral plane may be nearly horizontal. The delivered fish body F1 is held by the holding surfaces 130a, 130b as shown in FIG. 13. The fish body F1 held by the holding surfaces 130a, 130b is cut in the dorsal skin 135 by the rotary circular knife 126. The fish body F1 cut in the dorsal skin 135 is further conveyed in the conveying direction A, and, as shown in FIG. 14, the pressing members 127a, 127b thrust the conveying chains 121a, 121b in the mutually approaching direction, and the fish body F1 is compressed by the holding surfaces 130a, 130b. At this time, as explained in relation to the prior art, since the ordinary flesh 146a and dark-colored flesh 146b of the fish body F1 are easily separated, the ordinary flesh 146a which occupies the majority of the fish body F1 is pushed out to the outside from the belly side and the back side. Since the back side is preliminarily cut open by the rotary circular knife 126, a relatively small pressing force is enough for the holding surfaces 130a, 130b to the fish body F1, and the ordinary flesh 146a may be easily taken out. Besides, since the holding member 125a is elastic and flexible, the pressure-fit member 139 is dislocated to the space 140 side, so that the dark-colored flesh 146b sticking to the skin near the backbone will not be crushed completely, thereby preventing the dark-colored flesh 146b from being pushed out together with the ordinary flesh 146a. Thus, more effectively, the ordinary flesh 146a and dark-colored flesh 146b can be separated, and only the ordinary flesh 146a can be taken out.

Figure 15:
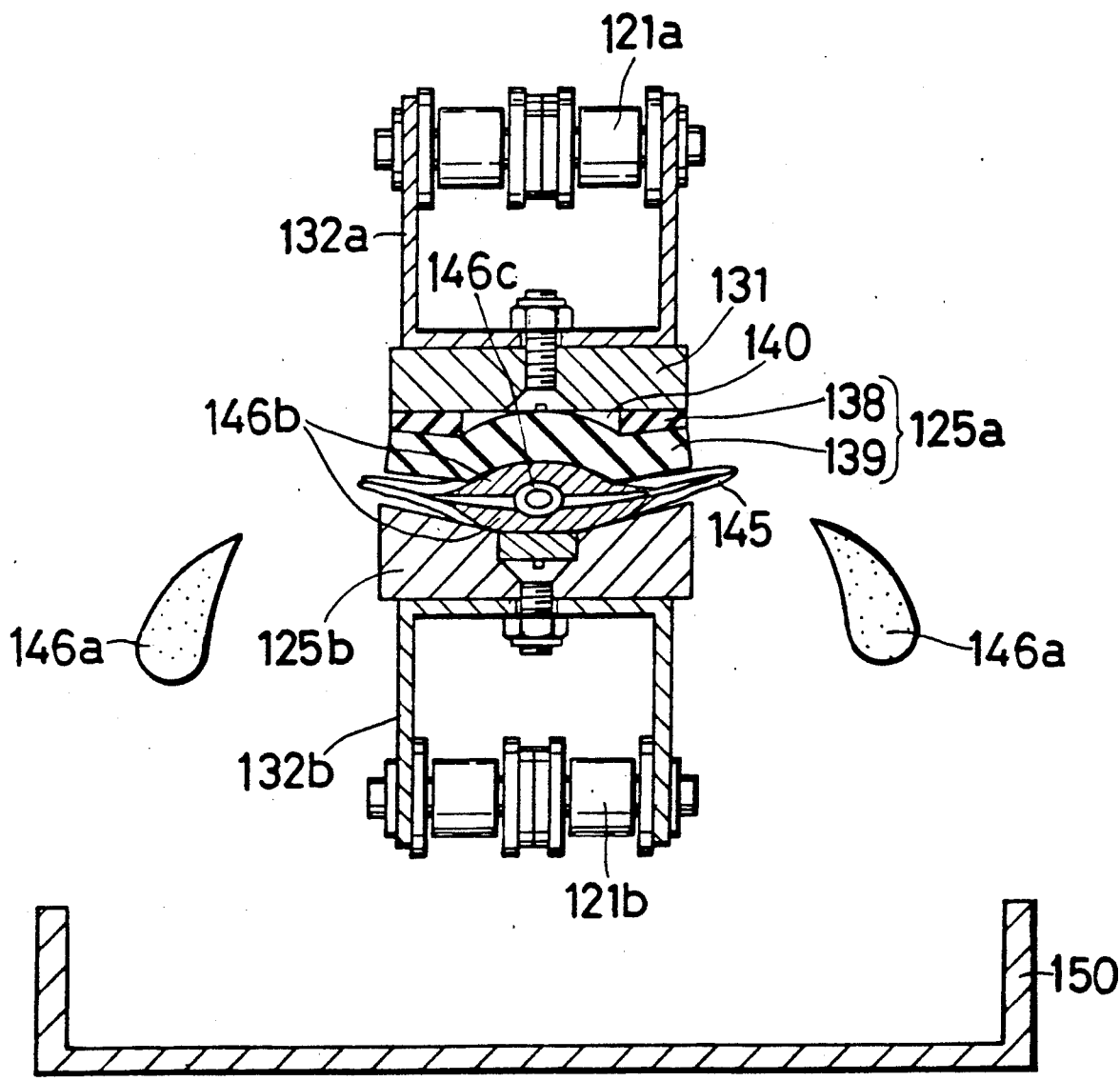
Figure 16:
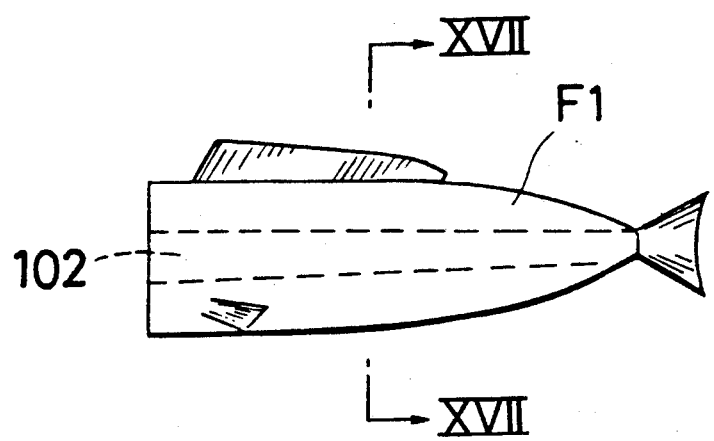
FIG. 16 is a side view of fish body F1.
Figure 17:
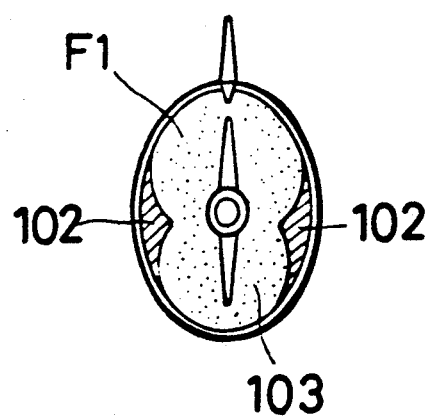
FIG. 17 is a sectional view of fish body F1 as seen from line VIII—VIII in FIG. 16.
Figure 18:
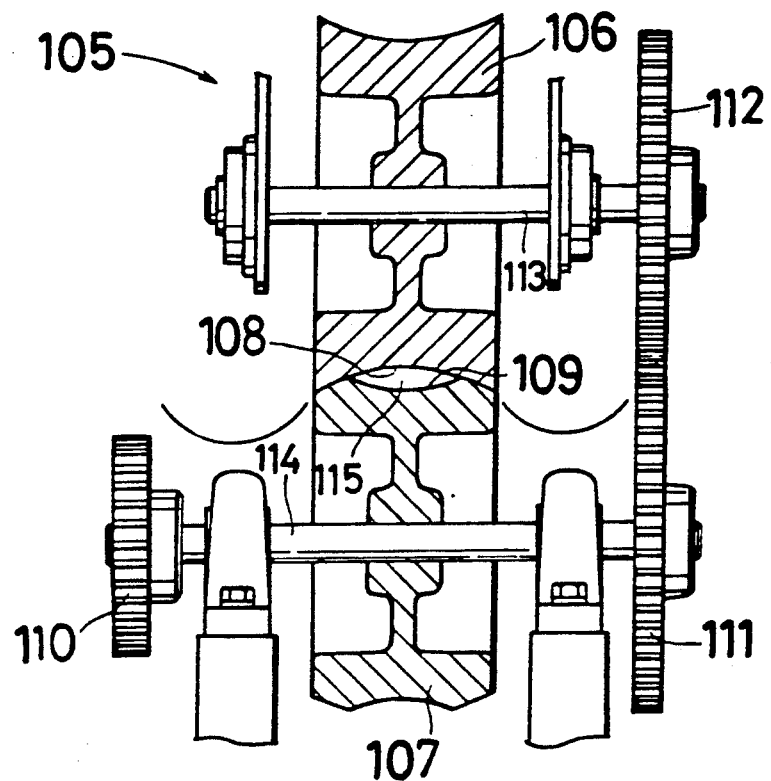
FIG. 18 is a sectional view of a conventional dark-colored flesh removing device 105.
Figure 19:
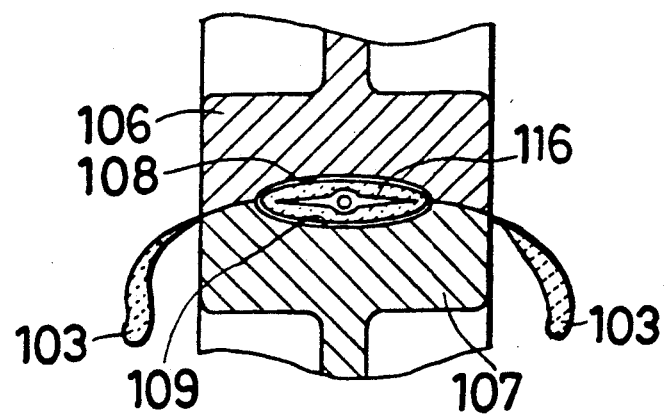
FIG. 19 is a sectional view of essential parts of dark-colored flesh removing device 105 in a state of holding the fish body F1.

The ordinary flesh 146a thus pushed out from the holding members 125a, 125b drops off from the holding members 125a, 125b as shown in FIG. 15, and is collected in the tray 150 installed beneath the conveying chain 121b. The skin 145, dark-colored flesh 146b, and backbone 146c remaining on the holding members 125a, 125b are discharged into a tray 151 (see FIG. 10) at the terminal end position in the conveying direction where the holding surfaces 130a, 130a are separated from each other. In this way, the dark-colored flesh 146b, backbone 146c, and skin 145 are removed from the fish body F1, and only the ordinary flesh 146a can be taken out.

In other embodiment of the invention, scrapers or/and brushes may be installed at both sides of the conveying route in order to scrape off the ordinary flesh 146a. Besides, when the surface 130a of the pressure-fit member 139 and the surface of the burying piece 142 in the groove 141 of the holding member 125b are roughened, the lateral slip of the fish body may be more securely prevented by the frictional force.

In a different embodiment of the invention, it is not limited to the structure of the foregoing embodiment in which the fish body F is held and conveyed in the vertical direction by the holding members 125a, 125b, but it may be possible to compose so as to hold in the horizontal direction, and such structure is also included in the technical concept of the invention.

In a further different embodiment of the invention, the space 140 may be filled with a filler having a flexibility made of at least softer material than the spacer 138, such as sponge and soft rubber. As a result, remaining of the force-out flesh may be prevented, and growth of bacteria is inhibited to keep clean, and the labor for cleaning the apparatus may be saved.

For reference, in the foregoing embodiment, the conveying chains 121a, 121b, and the holding members 125a, 125b affixed to these conveying chains 121a, 121b were used, but when designed to hold the fish body F1 by conveying belt instead of them, if the fish body F1 is relatively large, a large frictional force acts between the fish body F1 and the holding surface of the conveying belt, and it causes to elongate the conveying belt unevenly, which may result in the intermittent conveyance of the fish body F1 or known as the jerky motion. In this embodiment, however, since the holding members 125a, 125b made of synthetic resin and conveying chains 121a, 1211b are used, the fish body can be smoothly conveyed while removing the dark-colored flesh without causing such jerky motion.

Furthermore, in the foregoing embodiments, the conveying chains 121a, 121b, the holding members 125a, 125b disposed parallel to the conveying chains 121a, 121b, and pressing members 127a, 127b for pressing the holding surfaces 130a, 130b of the holding members 125a, 125b are disposed in the vertical direction, but these members may be also disposed in the lateral direction or obliquely, and such compositions also belong to the scope of the invention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A dark-colored flesh removing device in a fish processing machine, said device comprising:
   a pair of endless conveying chains disposed above and below in a vertical direction for conveying fish bodies in a longitudinal direction along a conveying route,
   holding members disposed parallel to said chains and including a lower side holding member disposed on the lower side conveying chain along said conveying route and having a concave fish body holding surface, and an upper side holding member disposed on the upper side conveying chain along said conveying route and made of elastic and flexible material, said upper side holding member being mounted on a support member,
   a pressing member for thrusting and pressing confronting holding surface of said upper side and lower side holding member toward each other, and
   means, disposed at an upstream end of said conveying route from said pressing member, for filleting the dorsal side of each of the fish bodies.

2. A dark-colored flesh removing device according to claim 1, wherein a space is defined between said upper side holding member and support member disposed on said upper side conveying chain.

3. A dark-colored flesh removing device according to claim 1, wherein a gap between said upper side holding member and said support member disposed on said upper side conveying chain is filled with a flexible material.

4. A dark-colored flesh removing device in a fish processing machine, said device comprising:
   a pair of endless conveying chains disposed at opposite right and left side positions for conveying fish bodies in a longitudinal direction along a conveying route,
   holding members disposed parallel to said chains and including a holding member on one side disposed on said conveying chain at said one side along said conveying route and having a concave fish body holding surface, and a holding member on other side and disposed on said conveying chain at said other side along said conveying route and made of elastic and flexible material, said other side holding member being mounted on a support member,
   a pressing member for thrusting and pressing confronting holding surface of said one side and other side holding members toward each other, and
   means disposed at an upstream end of said conveying route from said pressing member, for filleting the dorsal side of each of the fish bodies.

* * * * *